United States Patent
Kumar et al.

(10) Patent No.: US 7,289,823 B1
(45) Date of Patent: *Oct. 30, 2007

(54) VIDEO OVERLAY BUFFER MIRRORED THROUGH A SHARED MAILBOX BETWEEN TWO PROCESSORS IN A FEATURE PHONE

(75) Inventors: Sandeep Kumar, Santa Clara, CA (US); Syed Zaidi, Fremont, CA (US); Sai K. Pothana, Sunnyvale, CA (US)

(73) Assignee: NeoMagic Corp., Santa Clara, CA (US)

( * ) Notice: Subject to any disclaimer, the term of this patent is extended or adjusted under 35 U.S.C. 154(b) by 531 days.

This patent is subject to a terminal disclaimer.

(21) Appl. No.: 10/904,337

(22) Filed: Nov. 4, 2004

Related U.S. Application Data

(63) Continuation-in-part of application No. 10/710,238, filed on Jun. 28, 2004, now Pat. No. 6,987,961.

(51) Int. Cl.
*H04M 1/00* (2006.01)
*H04B 1/38* (2006.01)
*H04L 12/58* (2006.01)

(52) U.S. Cl. .................. 455/550.1; 566/412.1
(58) Field of Classification Search ............ 455/550.1, 455/566, 412.1
See application file for complete search history.

(56) References Cited

U.S. PATENT DOCUMENTS

| | | | |
|---|---|---|---|
| 4,374,409 A | 2/1983 | Bienvenu et al. | 718/106 |
| 4,498,079 A | 2/1985 | Ghosh et al. | 463/33 |
| 5,099,331 A | 3/1992 | Truong | 348/564 |
| 5,657,049 A | 8/1997 | Ludolph et al. | 345/856 |
| 5,794,054 A | 8/1998 | Le et al. | 710/240 |
| 5,812,789 A | 9/1998 | Diaz et al. | 709/247 |
| 5,842,015 A | 11/1998 | Cunniff et al. | 718/104 |
| 6,169,911 B1 | 1/2001 | Wagner et al. | 455/566 |
| 7,107,044 B1* | 9/2006 | Zaidi et al. | 455/412.1 |
| 2002/0055979 A1 | 5/2002 | Koch et al. | 709/212 |
| 2004/0204067 A1* | 10/2004 | Kurakane | 455/556.1 |
| 2005/0125733 A1* | 6/2005 | Aleksic | 715/716 |
| 2005/0184993 A1* | 8/2005 | Ludwin et al. | 345/502 |

\* cited by examiner

*Primary Examiner*—Lester G. Kincaid
*Assistant Examiner*—Marisol Figueroa
(74) *Attorney, Agent, or Firm*—g Patent LLC; Stuart T. Auvinen

(57) ABSTRACT

A feature phone has two processors that share a display. The display is attached to an applications processor that has a frame buffer for refreshing the display. A base-band processor also runs programs that generate graphics data that is written to a base-band frame buffer. Updates to the base-band frame buffer are sent through a shared-memory interface to a shared memory, and a shared mailbox is written with the message length, triggering a mailbox-interrupt to the applications processor. The applications processor reads the message from the shared memory and updates a copied frame buffer. An overlay engine uses the copied frame buffer to refresh the display when the base-band processor has the focus, or to refresh a smaller base-band window that covers a portion of the display, leaving the rest of the display area for applications-processor graphics data. Rapid switching between the copied and local frame buffer is possible.

20 Claims, 8 Drawing Sheets

VIDEO OVERLAY BUFFER MIRRORED THROUGH A SHARED MAILBOX BETWEEN TWO PROCESSORS IN A FEATURE PHONE

RELATED APPLICATION

This application is a continuation-in-part of the application for "Ethernet Emulation Using a Shared Mailbox Between Two Processors in a Feature Phone", U.S. Ser. No. 10/710,238, filed Jun. 28, 2004 now U.S. Pat. No. 6,987,961.

FIELD OF THE INVENTION

This invention relates to mobile feature phones, and more particularly to sharing a display among two processors on a feature phone using a shared-mailbox interface.

BACKGROUND OF THE INVENTION

A widely used electronic device today is the mobile or cellular phone. Improvements in capabilities and features have been made as newer generations of mobile phones and infrastructure are introduced. Third and fourth generation (3G and 4G) phones can access high-bandwidth cellular networks, enabling video, gaming, and other multimedia services.

While there may be various implementations of feature phones, a dual-processor implementation is sometimes used. FIG. 1 shows a feature phone with two processors. Feature phone 10 has advanced capabilities, and includes applications processor 20 to execute programs that implement some of these more advanced features, such as H.264 or MPEG-4 video encoding and decoding, camera support, and MP3 audio player support.

Radio-frequency RF circuit 22 includes one or more chips and transmits and receives radio signals over the antenna of phone 10. These signals are converted to digital form and communicated with base-band processor 24. Control of the transceiver and implementation of cellular communications protocols is handled by base-band processor 24.

Information such as phone numbers, call status, and menus are displayed to a phone user on display 12, which may be a liquid crystal display (LCD). Keypad 14 accepts user-inputted phone numbers and text, with keys for sending and ending a call in addition to numeric telephone keys. Control over keypad 14 is handled by base-band processor 24, while display 12 is controlled by applications processor 20.

A separate applications processor 20 can provide a more robust phone platform since base-band processor 24 does not have to been significantly altered for advanced features, which are executed on applications processor 20.

User data such as call logs, phone numbers, and user preferences are stored in memory 16. Memory 16 can be a static random-access memory (SRAM), flash, or other non-volatile memory. Memory 16 can be accessed by base-band processor 24 and/or by applications processor 20. Data can be shared when both processor have operating systems that can recognize file formats used by the other processor.

Some data must be transferred between base-band processor 24 and applications processor 20. For example, video or picture data may be received over the cell network by base-band processor 24 and transferred to applications processor 20 for further processing, or a digital camera image captured by applications processor 20 may be sent to base-band processor 24 for transmission over the cell network.

The desire to reduce the size of the phone as much as possible may require that peripheral devices be shared among the two processors. For example, display 12 can be attached to and controlled by applications processor 20, which may execute more graphics-rich programs than base-band processor 24 does. However, sometimes display data is generated by execution of programs that are executing on base-band processor 24 rather than on applications processor 20. It may be desirable to transfer graphics information from base-band processor 24 to applications processor 20 in such as situation.

The interface between applications processor 20 and base-band processor 24 may be difficult to use. For examples, special software drivers may need to be written for execution on both applications processor 20 and base-band processor 24 for transferring various types of data. Lower-level software or operating system modules may need to be modified. Such changes require extensive compatibility testing to ensure that the phones do not fail in the field.

The parent application disclosed a feature phone with a base-band processor and applications processor that used a shared-mailbox interface between the two processors. The parent application disclosed emulating a network such as Transport-Control-Protocol/Internet Protocol (TCP/IP) and Ethernet using this shared-mailbox interface.

What is desired is a feature phone with a graphical interface shared among the applications processor and base-band processor. It is desired to use the shared mailbox interface between the processors for relaying display information. Sharing and overlaying graphics data from the two processors using the shared-mailbox interface is desirable. Rapid switching between display data generated from the two processor is desirable.

DETAILED DESCRIPTION

The present invention relates to an improvement in feature phones. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors realize that display data from the applications processor can be stored in a frame buffer and directly displayed on the display attached to the applications processor. Display data generated by the base-band processor can be first stored in a local frame buffer on the base-band processor, then copied through the shared mailbox interface into the shared memory on the applications processor. Then a graphics overlay engine on the applications processor can overlay data from the shared memory with the applications processor frame buffer data.

Figure 1:
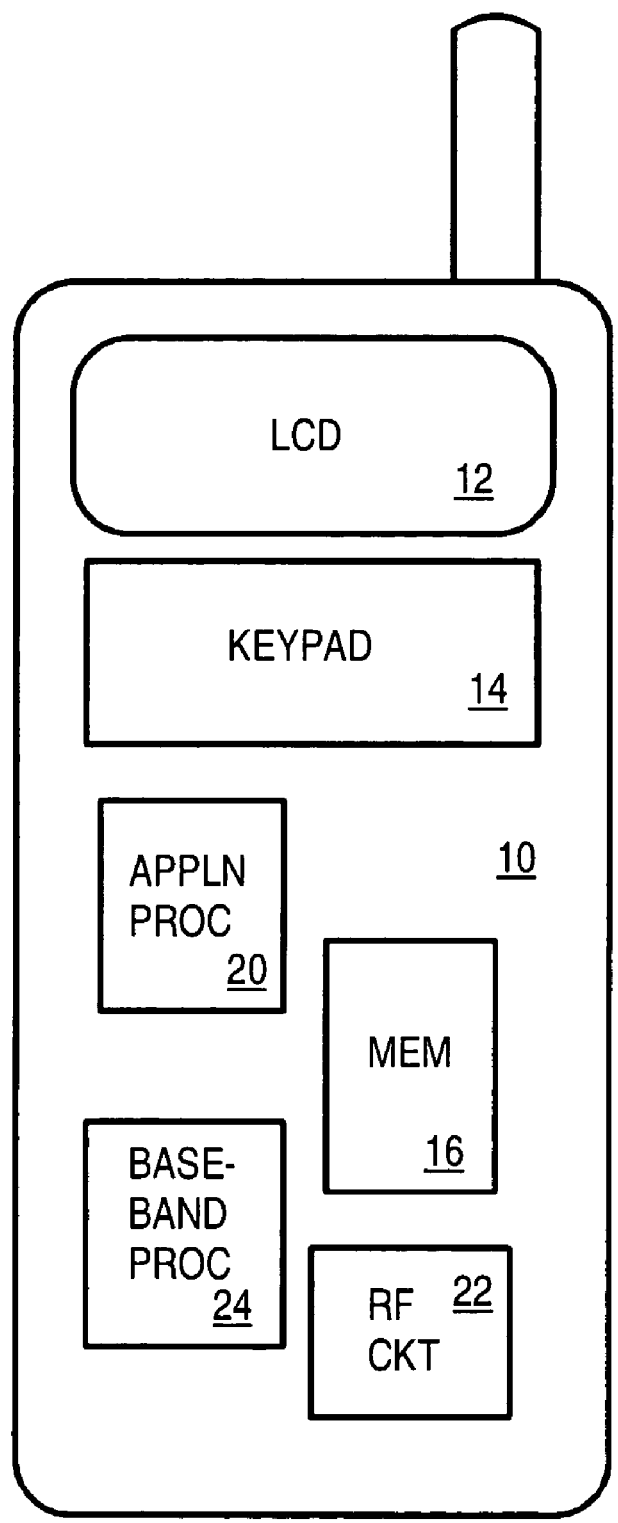
FIG. 1 shows a feature phone with two processors.
Figure 2:
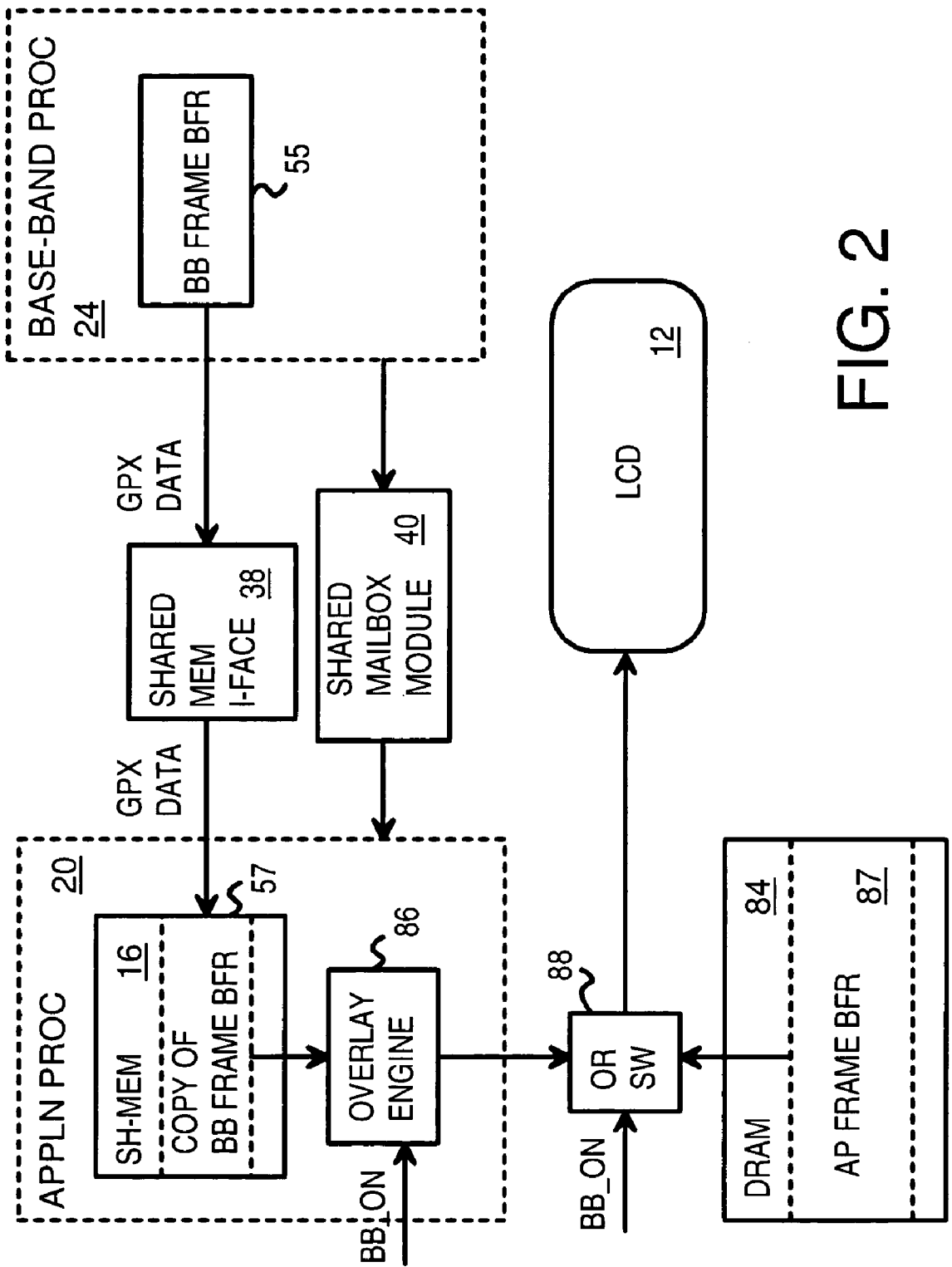
FIG. 2 shows processors in a feature phone using a shared-mailbox interface to share a display.

FIG. 2 shows processors in a feature phone using a shared-mailbox interface to share a display. Display 12 can be a liquid crystal display (LCD) or flat-panel or other kind of display used by the feature phone to display data to the user. Some of the graphics display information may be generated by base-band processor 24, such as calling information when making a call and address book viewing. Other graphical information may be generated by more advanced application programs running on applications processor 20, such as 3D games, photo viewers or editors, MPEG, H.264, MP3 playback, Java Games, and camera applications.

Graphics data generated by programs running on applications processor 20 are written to local frame buffer 87 in memory 84. Memory 84 could be a dynamic-random-access memory (DRAM) or a graphics-RAM external to applications processor 20, or could be an internal memory or a portion of a larger memory array.

Programs running on base-band processor 24 also may generate graphics, which is written to base-band frame buffer 55, which is a portion of memory in base-band processor 24. However, since display 12 is attached to applications processor 20 and not to base-band processor 24, graphics data in base-band frame buffer 55 is not directly displayable on display 12.

Graphics data in base-band frame buffer 55 is copied through shared-memory interface 38 and written to copied frame buffer 57 in shared memory 16. An interrupt to applications processor 20 when new graphics data is written to copied frame buffer 57 can be signaled using shared mailbox 40. Shared memory 16 can be part of a large shared memory on applications processor 20 that is accessible by base-band processor 24 through shared-memory interface 38.

Since copied frame buffer 57 is now local to applications processor 20, graphics data from copied frame buffer 57 can be displayed on display 12. Overlay engine 86 is activated when the base-band data is to be displayed, as indicted by signal BB_ON being activated. Then graphics data from copied frame buffer 57 is sent to display 12 through overlay engine 86. OR switch 88 routes graphics data from overlay engine 86 to display 12 when BB_ON is active, displaying data from base-band processor 24, but routes graphics data from local frame buffer 87 when BB_ON is inactive, displaying data from applications processor 20.

Figure 8:
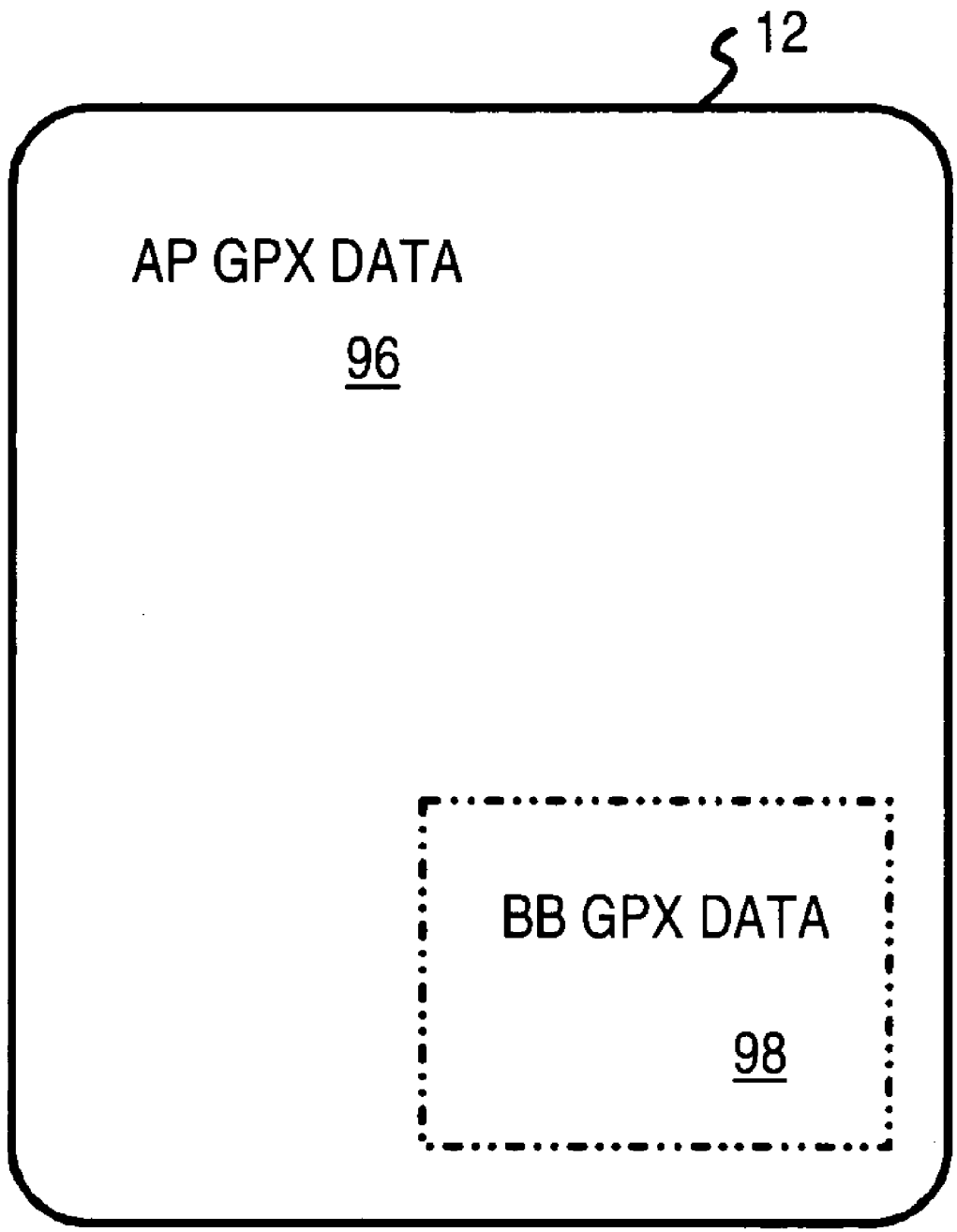
FIG. 8 shows a display for a feature phone that has a base-band processor window overlaying an applications processor window.

Additional graphics processing can be performed by overlay engine 86. For example, graphics data from base-band processor 24 may be intended for a smaller-size display than data from applications processor 20. Then the graphics data in copied frame buffer 57 can be scaled or stretched to fit the larger physical display 12. Color-re-mapping or color keying may also be performed by overlay engine 86 or by another graphics unit (not shown). For example, OR switch 88 may place overlay data from overlay engine 86 over just a portion of display 12, while data from local frame buffer 87 is displayed on the remainder of display 12, as shown in FIG. 8.

Figure 3:
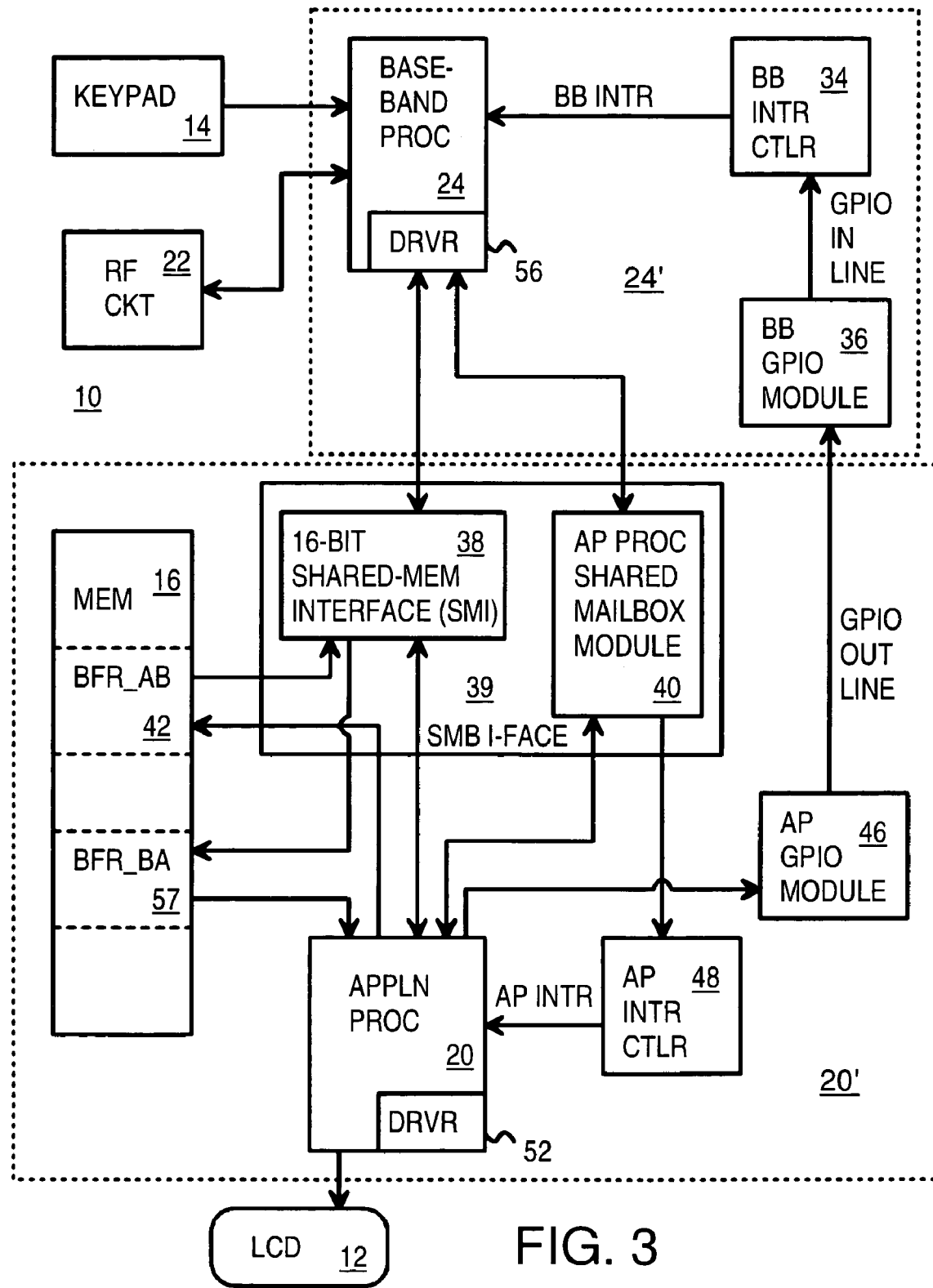
FIG. 3 is a diagram of a feature phone with display sharing through a shared mailbox.

FIG. 3 is a simplified diagram of a feature phone with display sharing through a shared mailbox. Base-band processor 24 on base-band processor chip 24' receives user input from keypad 14 while applications processor 20 on applications processor chip 20' sends display information to the user on display 12, which can be a liquid crystal display (LCD) or other display. RF circuit 22 sends and receives phone-call data over a radio link to a cellular base station. Base-band processor 24 acts as the controlling processor while applications processor 20 acts as a subordinate processor. Rigorous testing and prior use in phones without an applications processor allow base-band processor 24 to provide a stable platform, while newer features can be executed by applications processor 20. Thus many bugs and potential phone crashes are isolated from base-band processor 24.

Advanced features are provided by high-level applications that execute on applications processor 20. A 16-bit shared-memory-interface (SMI) links applications processor 20 to base-band processor 24 through shared memory 16. Base-band processor 24 can read and write data to shared memory 16 through shared-memory interface 38 while applications processor 20 reads and writes shared memory 16 directly.

Shared memory 16 contains data and event buffers, including copied frame buffer 57 that contains the graphics data from base-band processor 24 that was copied through shared-memory interface 38.

A-to-B buffer 42 is written by event acknowledgement or other data from applications processor 20. A-to-B buffer 42 is read through shared-memory interface 38 when called by the kernel on base-band processor 24.

Shared memory 16 may contain non-buffer memory, or it may be entirely used for buffer memory. For example, a 32 K-byte memory could have addresses 0-16 K for copied frame buffer 57 and addresses 16-32 K for A-to-B buffer 42.

Since graphics data may be updated at various times by base-band processor 24, the applications processor 20 must be notified when new data has been written into copied frame buffer 57 in shared memory 16 and is ready for reading by the graphics controller. Interrupts are used for such notification. Shared mailbox 40 in shared mailbox (SMB) interface 39 is used for interrupts to applications processor 20. A GPIO line is used as an interrupt to base-band processor 24 for any acknowledgements or return data.

When applications processor 20 finishes writing an acknowledgement message or data to shared memory 16, applications processor 20 toggles the state of an I/O line using GPIO module 46. The changed state of the GPIO line is detected by GPIO module 36, which activates an interrupt to base-band processor 24 using base-band interrupt controller 34. Base-band interrupt controller 34 and GPIO module 36 can be integrated together with base-band processor 24 on the same chip 24' as a base-band microcontroller.

When base-band processor 24 finishes writing graphics data to copied frame buffer 57 in shared memory 16 through shared-memory interface 38, base-band processor 24 writes a message into shared mailbox 40. Writing of this message causes shared mailbox 40 to generate an interrupt to controller 48 that is passed to applications processor 20. Applications processor 20 can then respond to the interrupt by activating its graphics driver. The graphics driver can check if the BB_ON is enabled or not. When it is enabled the graphics from the base-band processor can be displayed using overlay, otherwise the base-band graphics is not displayed but the latest graphics data is available in the shared memory.

Shared-memory interface 38, shared mailbox 40, interrupt controller 48, and GPIO module 46, can be integrated together with applications processor 20 as a single chip 20'. Shared memory 16 may also be integrated, or may be separate or part of a larger external memory. Various software drivers 52, 56 may be executed by applications processor 20 and by base-band processor 24.

Figure 4:
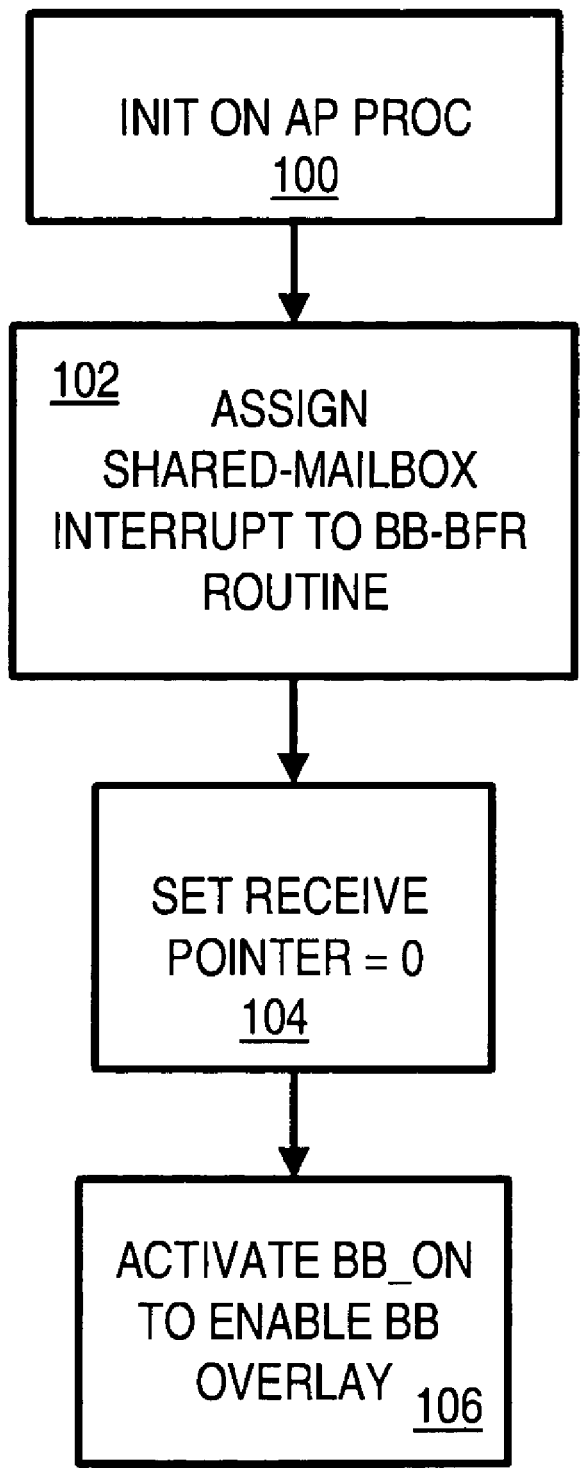
FIG. 4 is a flowchart of an initialization routine on the applications processor.
Figure 6:
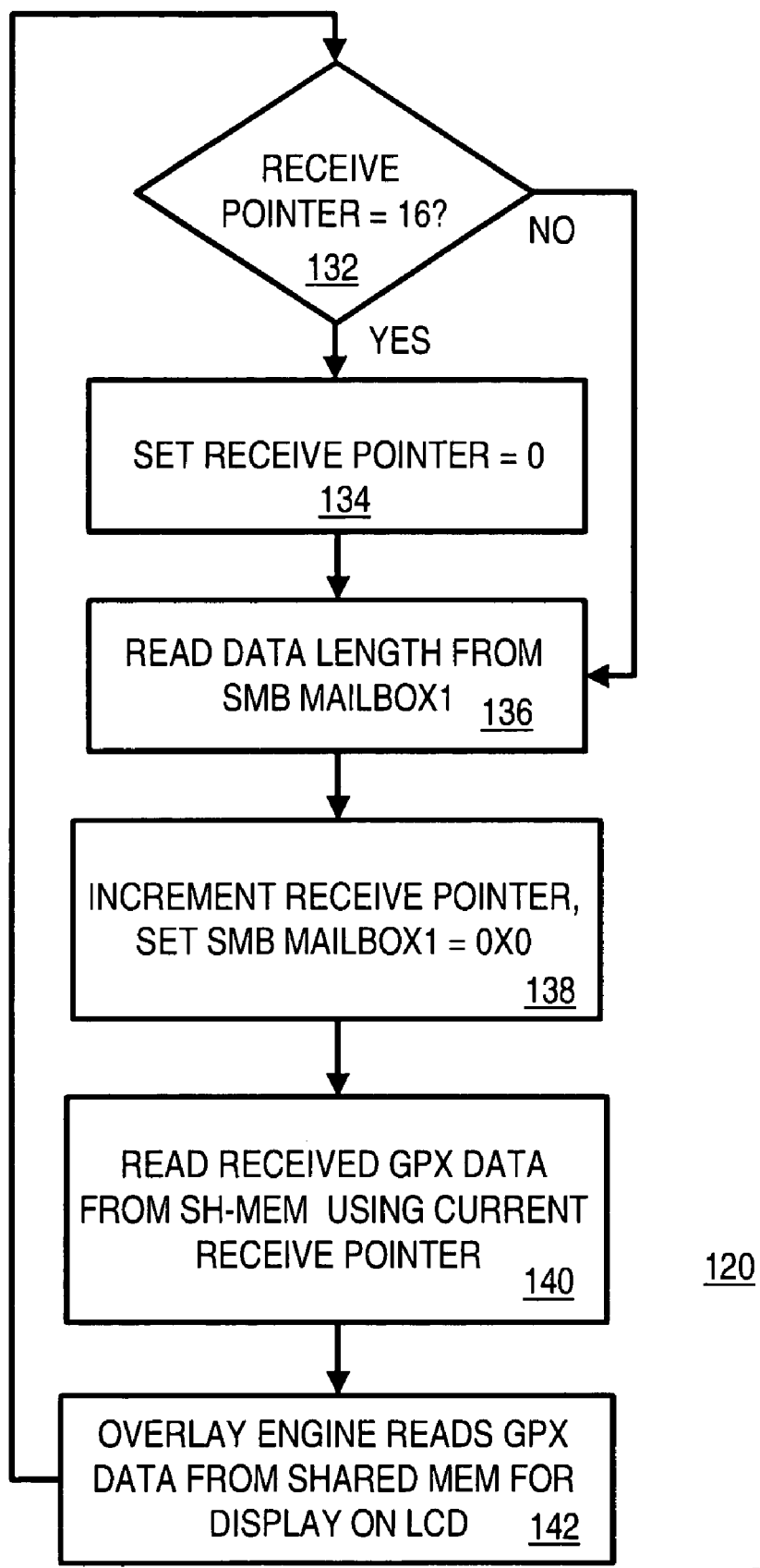
FIG. 6 is a flowchart of a receive routine executing on the applications processor for receiving graphics data sent over the shared-memory interface.

FIG. 4 is a flowchart of an initialization routine on the applications processor. When the applications processor is initialized, reset, or re-configured, such as to enable displaying data from base-band processor 24 on display 12, step 100, the shared-mailbox interrupt is assigned (step 102) to activate the shared-mailbox receive routine to read the graphics-data message from the shared mailbox and/or the shared memory. This receive routine 120 is shown in FIG. 6.

The receive pointer is reset to zero or to some other pre-determined value, step 104. The receive buffer can then receive graphics-data messages. The BB_ON signal can be activated to enable overlay engine 86 to overlay the graphics data from copied frame buffer 57 to display 12, step 106. Alternately, overlay can be configured and later enabled once copied frame buffer 57 has been filled with graphics data. An initial fill routine can be executed to fill copied frame buffer 57 with graphics data, or dummy or pre-determined data can be written into copied frame buffer 57 before graphic updates are received. For example, a blue colored screen or box could be initially displayed for base-band processor 24. Once graphics data is sent over shared-memory interface 38 to load copied frame buffer 57 with real data from base-band processor 24, then the actual data generated by programs on base-band processor 24 is displayed.

Overlay engine 86 could be enabled and disabled frequently, such as when the focus switches from applications processor 20 to base-band processor 24. Another routine could activate BB_ON and overlay engine 86 when the focus switched to base-band processor 24, and disable BB_ON and overlay engine 86 when the focus switches back to applications processor 20. Also, both applications processor 20 and base-band processor 24 could simultaneously run programs and update display 12 when display 12 is split or the data from base-band processor 24 is kept in a window that is smaller than the whole screen of display 12. Then overlay engine 86 could be left enabled.

Figure 5:
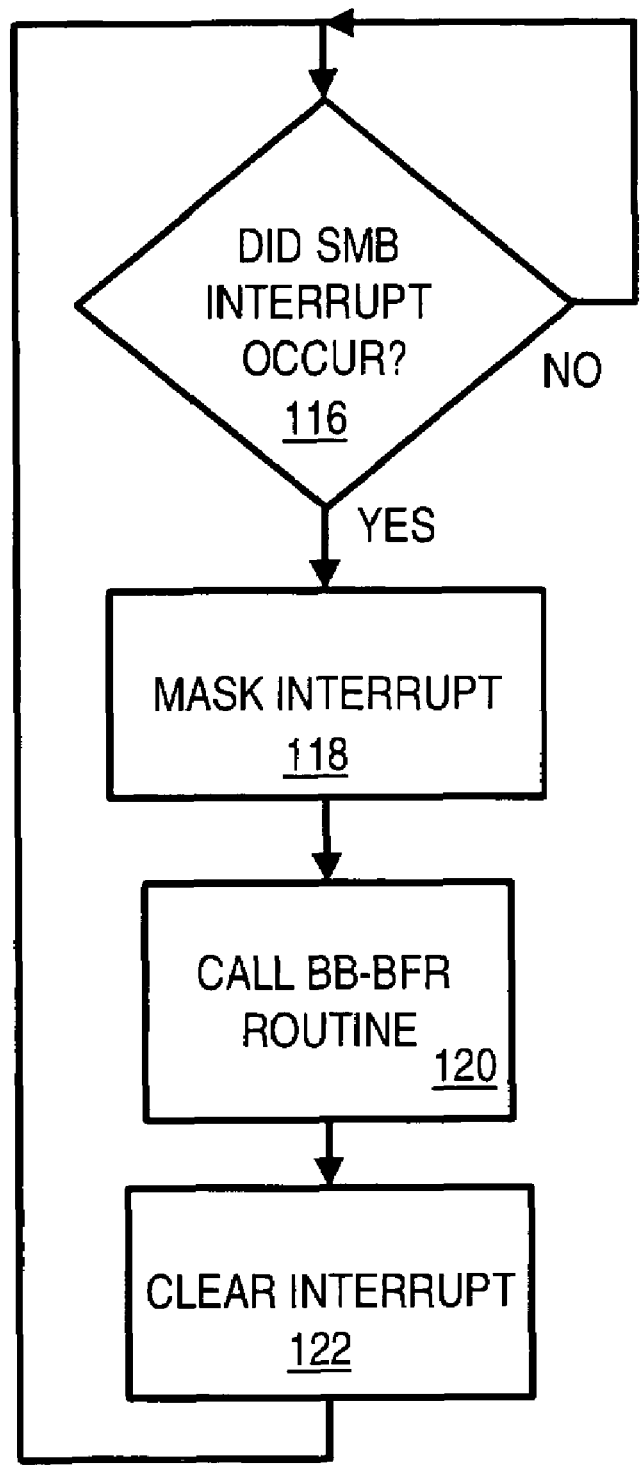
FIG. 5 is a flowchart of an interrupt checking routine executing on the applications processor.

FIG. 5 is a flowchart of an interrupt checking routine executing on the applications processor. The routine waits for the shared-mailbox interrupt to occur, step 116. An interrupt table or other interrupt handler can check for all kinds of interrupts and then send the SMB interrupt to this routine. Once this shared-mailbox interrupt is detected, the interrupt is masked, step 118, to prevent another SMB interrupt from being detected while the current interrupt is being processed.

The shared-mailbox receive routine 120 is called to read the graphics-data message from the shared mailbox and/or the shared memory. This receive routine 120 is shown in FIG. 6. After routine 120 has read the graphics-data message and finished processing, control is passed back to this interrupt checking routine and the interrupt is cleared, step 122. The interrupt checking routine can then wait for the next shared-mailbox interrupt to arrive, step 116.

FIG. 6 is a flowchart of the receive routine executing on the applications processor for receiving graphics data sent over the shared-memory interface. Pointer locations 0-16 are in copied frame buffer 57 in the shared memory. When the receive pointer has reached the end of copied frame buffer 57, the pointer value is 16, step 132. Then the pointer wraps around to the first location, by setting the receive pointer to 0, step 134. Otherwise the receive pointer is unaltered.

Shared mailbox 40 can have several internal locations, such as mailbox #1, mailbox #2, etc. The message length is read from mailbox #1 in shared mailbox 40, step 136. The message length can be less than 1 K bytes, even though the pointers increment by 1 K bytes for each message. The receive pointer is incremented, and a zero-value is written to shared mailbox #1 to acknowledge receipt of the message, step 138.

The receive pointer may be used to read the new graphics-data message from shared memory 16, step 140. Only bytes up to the message length are read. Any header or protocol information may be stripped from the message and the graphic data extracted from the message. The graphics data may then be written to copied frame buffer 57 at a location indicated by the receive pointer, or a location indicated by an x,y address in the message. When the message contains only graphics data, the data may simply be left alone in the shared memory. A temporary receive buffer may not be needed.

Overlay engine 86 can then read from copied frame buffer 57 when refreshing display 12, step 142. Since copied frame buffer 57 has been written with the graphics-data updated extracted from the messages sent over shared-memory interface 38, the graphics data being displayed is freshly updated with data generated by programs running on base-band processor 24. Shared-mailbox receive routine 120 can be called again after new data is written through shared-memory interface 38 and the shared-mailbox interrupt is again received.

Figure 7:
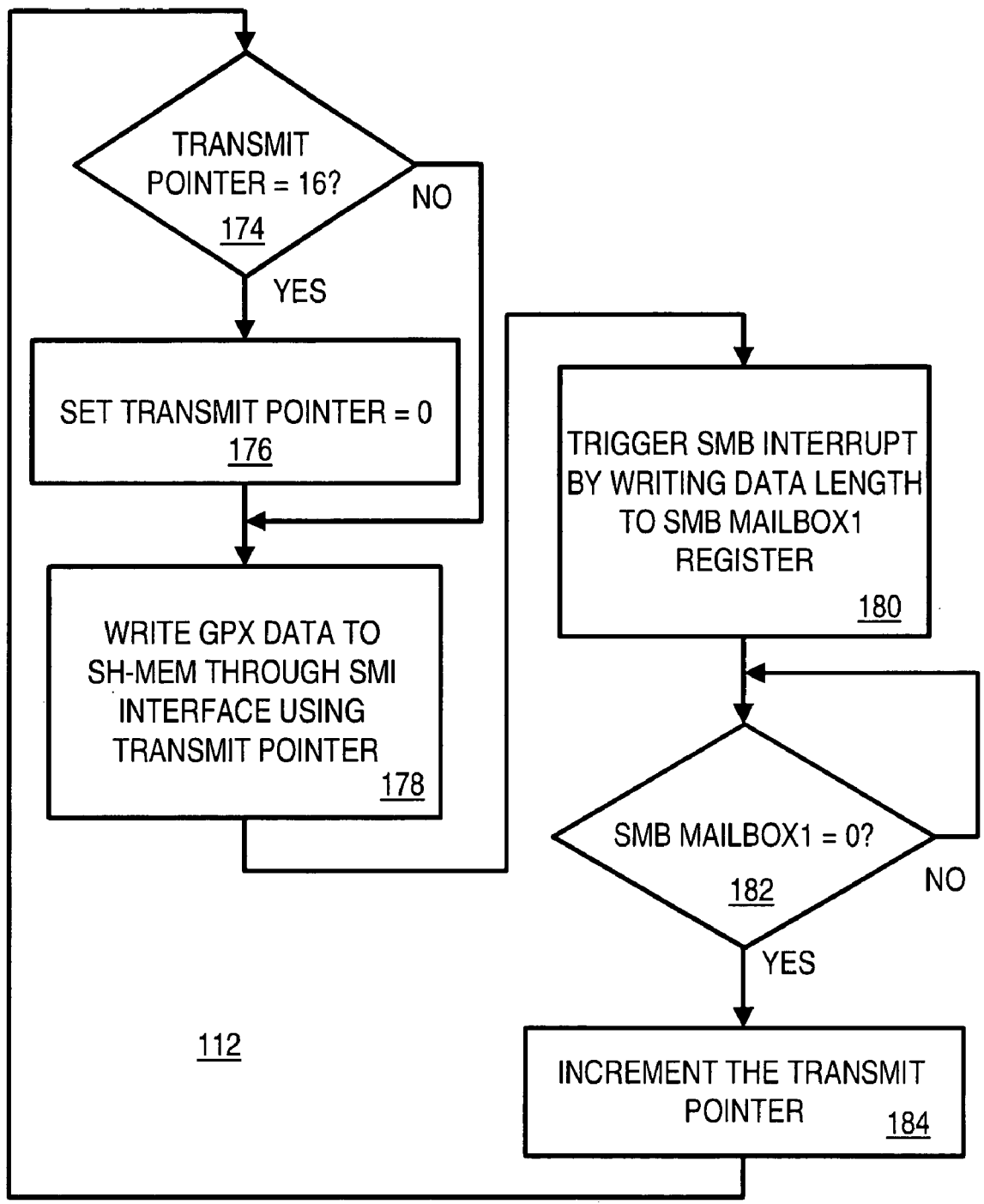
FIG. 7 is a flowchart of a shared-mailbox transmit routine that runs on the base-band processor.

FIG. 7 is a flowchart of a shared-mailbox transmit routine that runs on the base-band processor. Shared-mailbox transmit routine 112 is called when graphics data generated by programs running on base-band processor 24 must be sent to the other processor. The programs running on base-band processor 24 write their graphics data to base-band frame buffer 55. Then transmit routine 112 copies this graphics data through shared-memory interface 38 to write the graphics data into copied frame buffer 57 in shared memory 16 on applications processor 20.

The entire contents of base-band frame buffer 55 can be copied over to copied frame buffer 57 each time the graphics data is changed, or periodically, such as in response to a timer. While this consumes bandwidth of shared-memory interface 38, it is a simple method.

Another approach is to copy only the changed graphics data. This has the advantage of reducing the bandwidth consumed, but a more complex protocol is needed to identify where in the frame buffer the updates need to be written to. An x,y address and a length can be added to the graphics data sent over shared-memory interface 38 in this case, or other protocols may be used to send the graphics-data updated in a message or packet.

A transmit pointer keeps track of the current write location in copied frame buffer 57 in the shared memory. A 16-location frame buffer is used in this example, but other buffer lengths could be substituted. Each location being written in the frame buffer could contain many pixels of data on a line, or even could contain multiple lines of the display. Copied frame buffer 57 and base-band frame buffer 55 can have the same size and arrangement of data, or could differ.

For example, a subset of base-band frame buffer 55 could be copied to copied frame buffer 57 as updates occur.

When the transmit pointer has reached the end of copied frame buffer 57, step 174, the pointer value of 16 is wrapped back to 0, the first location in the buffer, step 176. This transmit pointer is used to select locations in the shared memory to write the graphics data to, step 178. The graphics data is written from base-band frame buffer 55 in base-band processor 24 through shared-memory interface 38 to copied frame buffer 57 in shared memory 16.

The length of the graphics data is written to mailbox #1, step 180. This length could be the length of just the graphics data, such as the number of display lines, pixels, or bytes, or it could be the message length, which might include header data that is not part of the graphics data in the frame buffers, such as x,y locations of the pixels, checksums, or other information. Writing mailbox #1 also causes the interrupt to be sent to the applications processor. Sending an interrupt upon writing to the first mailbox location is a built-in function of the shared mailbox module.

The transmit routine then repeatedly re-reads or polls mailbox #1 in the shared mailbox module after some delay to allow applications processor 20 to write the mailbox. Mailbox #1 contains the message length written by base-band processor 24, but is over-written by applications processor 20 with a zero-value once applications processor 20 has read the message. Thus once a zero is read from mailbox #1, step 182, the transmitted message has been received. The transmit pointer is incremented, step 184, and the next message can be transmitted by repeating the routine. Additional lines of the frame buffer can then be sent over shared-memory interface 38.

FIG. 8 shows a display for a feature phone that has a base-band processor window overlaying an applications processor window. While the entire screen area of display 12 may be switched between displaying graphics data from only applications processor 20 and from only base-band processor 24, graphics data from both applications processor 20 and base-band processor 24 can be simultaneously displayed. Graphics data from base-band processor 24 can be displayed in smaller base-band window 98, which is overlaid over just a portion of display 12, covering part of the graphics data generated by applications processor 20. The remaining, un-covered area of display 12 is available for display of graphics data generated by applications processor 20. Applications-processor display area 96 can be updated while base-band window 98 is also being updated.

Since applications processor 20 tends to execute more complex applications, a larger area of display 12 can be allocated to applications-processor display area 96 while a smaller area is allocated for base-band window 98. The data from base-band processor 24 may be scaled to fit in base-band window 98.

Rapid program switching between the two processors is possible. The display can be rapidly changed from displaying data for a program running on applications processor 20 to the graphics data generated by a program running on base-band processor 24 by enabling overlay engine 86. Since overlay engine 86 can be enabled and disabled very quickly, display switching is rapid. In addition, rather than changing the entire display, only part of the display can have the overlay (base-band-processor) data. This smaller window can pop over the larger window containing the graphics data from applications processor 20 when the program running on base-band processor 24 is displaying data.

Alternate Embodiments

Several other embodiments are contemplated by the inventors. For example a 16-line frame buffer could have 16 locations, or other lengths and pointer counts other than 16 could be used, and the amount of data in each pointer location could also be adjusted. An interrupt table or other mechanism can be used to route interrupts from various sources to the intended service routines. A hardware interrupt controller may also be used to prioritize hardware interrupts.

The graphics-data may be embedded in a message or carried by a packet and have some formatting fields and other information. Various formatting routines may be called. The graphics data can be converted and modified in a variety of ways, such as by color-re-mapping, scaling, stretching, value-limiting, clipping, re-formatting from YUV to RBG or for different pixel-widths, etc. Graphics data can be reformatted when copying from one buffer to another, such as from base-band frame buffer 55 to copied frame buffer 57 or to the display. Pixels and lines can be dropped or discarded, and non-displaying graphics data or off-screen data may be present.

More than one display could be supported. The shared-memory interface can have a width other than 16 bits, as can other interfaces.

Various message sizes could be stored in the shared memory, and the pointers could be advanced by these message sizes rather than by 1 K bytes. A larger word or memory line rather than a byte could be the addressing size, and pointer incrementing could be adjusted. Internal pointers may use different units than the transmit and receive pointers. Direct-memory access (DMA) could be used for data transfer and use its own DMA pointers.

The display could be attached to the other (base-band) processor, or to a third processor. More than 2 processors could be included in the feature phone, or sub-processors or special functional units could be used by a processor.

The shared-mailbox could itself be shared by several high-level applications or low-level drivers. Different mailbox #'s could be used for different purposes, or a message code could indicate which use the message is for. The message code could be decoded to determine which driver to call, such as a hardware-interface driver, a display driver, a reset routine, or another driver.

Other devices such as a shared disk drive could be attached to applications processor 20 or to base-band processor 24. Additional memories, interrupt sources, and links could be added, and additional functions supported. Hardware, software, firmware, or a variety of combinations may be used to implement various functions and modules described herein. The two processors could each be integrated with memories, interrupt controllers, and I/O devices and could even be integrated together on a large chip.

The feature phone could have a variety of integrated features and hardware, such as a camera for capturing video or still photos, phone and address books, databases, projection displays or keyboards, etc. The feature phone could be a personal digital assistant (PDA) or other handheld or wearable device with wireless communications capabilities over wireless phone networks.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A dual-processor wireless-communications device comprising:
   a wireless transceiver for sending and receiving wireless data over a wireless network using wireless protocols;
   a base-band processor, coupled to control the wireless transceiver, for executing routines using a first operating system kernel including routines to transmit and receive wireless data through the wireless transceiver;
   a base-band frame buffer, coupled to the base-band processor, for storing base-band graphics data generated by routines executing on the base-band processor;
   an applications processor for executing application programs using a second operating system kernel;
   a shared memory having a first buffer that is written by the base-band processor and read by the applications processor;
   a transmit routine, executing on the base-band processor and coupled to the base-band frame buffer, the transmit routine writing a graphics-update message to the first buffer in the shared memory in response to the routines executing on the base-band processor updating the base-band graphics data in the base-band frame buffer;
   a shared mailbox, coupled to be written by the applications processor and by the base-band processor, having a plurality of mailbox locations, wherein writing to a first mailbox location in the shared mailbox generates a second interrupt to the applications processor;
   a receive driver, executed by the applications processor in response to the second interrupt, the receive driver reading the graphics-update message from the first buffer in the shared memory in response to the second interrupt;
   a copied frame buffer, coupled to the applications processor, having a copy of the base-band graphics data, the receive driver updating the copy of the base-band graphics data in the copied frame buffer in response to the graphics-update message; and
   a display, coupled to the applications processor, for displaying to a user the base-band graphics data from the copied frame buffer generated by the base-band processor and for displaying applications information to the user generated by the application programs;
   whereby the display is shared by passing messages through the shared memory using the shared mailbox.

2. The dual-processor wireless-communications device of claim 1 further comprising:
   an overlay engine, coupled to the display, for driving the base-band graphics data to the display in response to a base-band-display signal being in an active state;
   a local graphics engine, coupled to the display, for driving local graphics data generated by the applications programs executing on the applications processor to the display in response to the base-band-display signal not being in the active state.

3. The dual-processor wireless-communications device of claim 2 further comprising:
   a local frame buffer, coupled to supply the local graphics data to the local graphics engine, for storing the local graphics data generated by the applications programs executing on the applications processor.

4. The dual-processor wireless-communications device of claim 2 wherein the base-band display signal is activated for a refresh time period of the display when the base-band processor has an execution focus for running the routines on the base-band processor;
   wherein only the base-band graphics data is displayed when the base-band display signal is in the active state.

5. The dual-processor wireless-communications device of claim 2 wherein the base-band display signal is activated for only a portion of a refresh time period of the display;
   wherein the base-band graphics data is displayed in a base-band window on the display, the base-band window being smaller in area than a display area of the display;
   wherein the local graphics data appears in the display area that is not covered by the base-band window.

6. The dual-processor wireless-communications device of claim 2 wherein the base-band graphics data displays call information to the user generated by the base-band processor.

7. The dual-processor wireless-communications device of claim 2 wherein the wireless data sent over the wireless network using the wireless protocols includes encoded voice data,
   wherein the dual-processor wireless-communications device is a feature wireless phone.

8. The dual-processor wireless-communications device of claim 2 further comprising:
   a first general-purpose input-output (GPIO) module, coupled to read a signal on a GPIO line and generate a first interrupt to the base-band processor in response to the signal on the GPIO line;
   a second GPIO module, coupled to write the signal onto the GPIO line in response to a command from the applications processor.

9. The dual-processor wireless-communications device of claim 8 wherein the applications processor sends an acknowledgement message to the base-band processor by writing the acknowledgement message to the shared memory and by activating the second GPIO module to write the signal onto the GPIO line;
   whereby the acknowledgement message is signaled to the base-band processor by the applications processor activating the GPIO line.

10. The dual-processor wireless-communications device of claim 2 wherein the first operating system kernel and the second operating system kernel are different operating systems.

11. A method for sharing a display between a first processor and a second processor within a mobile device comprising:
    the first processor generating first graphics data and activating a transmit driver;

the transmit driver generating a graphics-update message identifying changes to the first graphics data and writing the graphics-update message to a shared memory, the transmit driver also writing to a shared mailbox to generate a second interrupt to the second processor;

the second processor, in response to the second interrupt, activating a receive driver;

the receive driver reading the graphics-update message from the shared memory in response to the second interrupt and updating copied graphics data in response to the graphics-update message;

the second processor executing second programs that generate second graphics data, the second processor refreshing a display controlled by the second processor using the second graphics data; and an overlay engine substituting the copied graphics data for the second graphics data for a first window portion of the display, whereby second graphics data on the display is overlaid with the copied graphics data for the first window portion, the copied graphics data being updated by the graphics-update messages sent through the shared memory.

12. The method of claim 11 further comprising:
the first processor writing the first graphics data to a first frame buffer on the first processor.

13. The method of claim 11 wherein the transmit driver writing to the shared mailbox comprises writing a length of the graphics-update message to the shared mailbox.

14. The method of claim 13 further comprising:
clearing the shared mailbox by the receive driver writing a zero to the shared mailbox.

15. The method of claim 11 wherein the mobile device is a mobile telephone, and wherein the first processor is a base-band processor and the second processor is an applications processor.

16. An applications processor that shares a local display with a base-band processor comprising:

processing means for executing high-level programs that generate local graphics data;

shared memory means for storing a graphics-update message received from the base-band processor;

inter-processor interface means, coupled between the shared memory means and the base-band processor, for allowing the base-band processor to write the graphics-update message to the shared memory means;

shared mailbox means, coupled to the inter-processor interface means and to the processing means, for generating a first interrupt in response to the base-band processor writing to a first location in the shared mailbox means;

display interface means for driving the local graphics data to the local display;

copied frame buffer means for storing remote graphics data;

graphics-update driver means, executing on the processing means and activated by the first interrupt, for reading the shared memory means to read graphics data from the graphics-update message sent from the base-band processor, the graphics-update driver means updating the remote graphics data stored in the copied frame buffer means in response to the graphics-update message;

overlay engine means, coupled to the copied frame buffer means, for driving the remote graphics data to the local display and blocking the local display interface means from driving the local graphics data to the local display for at least a window portion of the local display, whereby the base-band processor writes the graphics-update message to the shared memory means and signals the applications processor by writing to the shared mailbox means.

17. The applications processor of claim 16 further comprising:

local frame buffer means for storing the local graphics data generated by the high-level programs;

wherein the display interface means reads the local graphics data from the local frame buffer means when the overlay engine means is not driving the remote graphics data to the local display.

18. The applications processor of claim 17 wherein the graphics-update driver means further comprises:

receive means, executing on the processing means, for reading the graphics-update message from the shared memory means in response to the first interrupt, the receive means passing the graphics-update message to the graphics-update driver means.

19. The applications processor of claim 18 wherein the receive means further comprises:

clearing means for clearing the first interrupt by writing to the first location in the shared mailbox means after the graphics-update message has been read from the shared memory means.

20. The applications processor of claim 17 wherein the applications processor and the base-band processor are within a mobile telephone.

* * * * *